(12) United States Patent
Chen et al.

(10) Patent No.: US 7,508,181 B2
(45) Date of Patent: Mar. 24, 2009

(54) SWITCHING REGULATOR CAPABLE OF COMPENSATING OUTPUT ERRORS

(75) Inventors: Ming-Hsueh Chen, Taipei County (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 314 days.

(21) Appl. No.: 11/456,216

(22) Filed: Jul. 10, 2006

(65) Prior Publication Data
US 2007/0222423 A1    Sep. 27, 2007

(30) Foreign Application Priority Data
Mar. 22, 2006    (TW) .............................. 95109905 A

(51) Int. Cl.
*G05F 1/56*    (2006.01)
*G05F 1/00*    (2006.01)
(52) U.S. Cl. .................. 323/282; 323/266; 323/281
(58) Field of Classification Search ................. 323/222, 323/266, 281, 282, 283, 284, 314, 326; 363/19, 363/74, 80, 89; 315/224; 702/64
See application file for complete search history.

(56) References Cited

U.S. PATENT DOCUMENTS

| | | | | |
|---|---|---|---|---|
| 5,770,940 | A | * 6/1998 | Goder | ........................ 323/282 |
| 5,847,554 | A | * 12/1998 | Wilcox et al. | ................ 323/282 |
| 6,813,173 | B2 | 11/2004 | Lipcsei | |
| 2002/0030456 | A1* | 3/2002 | Kim | ........................... 315/307 |
| 2005/0212499 | A1* | 9/2005 | Yasukouchi | ................. 323/282 |
| 2006/0176038 | A1* | 8/2006 | Flatness et al. | ............. 323/282 |

FOREIGN PATENT DOCUMENTS

| | | |
|---|---|---|
| TW | 200513012 | 4/2005 |
| TW | 200601677 | 1/2006 |

* cited by examiner

*Primary Examiner*—Akm E Ullah
*Assistant Examiner*—M'Baye Diao
(74) *Attorney, Agent, or Firm*—Winston Hsu

(57) ABSTRACT

A switching regulator includes a power stage, an output capacitor, a first reference voltage generator, a comparator, a constant-time trigger, an error amplifier, and an operator. The power stage includes a first switch, a second switch, and an output inductor. The comparator is coupled to the output inductor and the operator for receiving an output voltage and a compensation reference voltage. The error amplifier is coupled to the output inductor and the reference voltage generator. The constant-time trigger is coupled to the comparator and the power stage. The operator is coupled to the reference voltage generator and the error amplifier.

18 Claims, 5 Drawing Sheets

SWITCHING REGULATOR CAPABLE OF COMPENSATING OUTPUT ERRORS

BACKGROUND OF THE INVENTION

1. Field of the Invention

The present invention relates to a switching regulator, and more particularly, to a switching regulator for adjusting output errors by compensating the reference voltage.

2. Description of the Prior Art

Regulators usually include switching regulators and liner regulators. The characteristics of liner regulators are that they are cheap, easy to use and respond quickly. However the efficiency of liner regulators is poor, often consuming 50% of the power. Although a switching regulator has slow response, its power efficiency is great. Power consumption plays an important role in circuit design nowadays. As for a quick response requirement, switching regulators utilize a constant-time trigger to substitute for an error amplifier with additional frequency compensation elements used for controlling signal differences between PWM loops. The constant-time trigger is used for triggering a fixed on time or a fixed off time to control the whole switching regulator.

Please refer to FIG. 1. FIG. 1 is a diagram of a switching regulator 10 according to the prior art. The switching regulator 10 includes a power stage 12, an output capacitor Cout, a loading Rload, a reference voltage generator 14, a comparator 15, and a constant-time trigger 16. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 16 and a control end 104 of the second switch SW2 for processing an inverse operation on a signal outputted from the constant-time trigger 16. The output capacitor Cout is coupled to the output inductor Lout with an output voltage Vout across the capacitor. The output capacitor Cout further includes an equivalent series resistance ESR. The loading Rload is coupled to the output capacitor Cout and the output inductor Lout. The reference voltage generator 14 is used for generating a reference voltage Vref. The comparator 15 includes a first input end 152 coupled to the output inductor Lout and the output capacitor Cout for receiving a feedback voltage $V_{FB}$ (equals the output voltage Vout). The comparator 15 includes a second input end 154 coupled to the reference voltage generator 14. The constant-time trigger 16 is coupled to the comparator 15 and the power stage 12. The constant-time trigger 16 is used for controlling turning on and off the first switch SW1 and the second switch SW2 of the power stage 12 according to a result of the comparator 15. An input end 122 of the first switch SW1 is coupled to an input voltage Vin, and an input end 124 of the second switch SW2 is coupled to ground. The comparator 15 is an error comparator. The first switch SW1 and the second switch SW2 are metal-oxide semiconductor transistors (MOS). When the constant-time trigger 16 is an on-time trigger, the constant-time trigger 16 is used for controlling on time of the first switch SW1 and the second switch SW2. When the constant-time trigger 16 is an off-time trigger, the constant-time trigger 16 is used for controlling off time of the first switch SW1 and the second switch SW2.

Please refer to FIG. 2 and FIG. 1. FIG. 2 is a diagram illustrating signal waveforms in FIG. 1. The upper waveform is a variation of an inductor current $I_L$ in time, where it rises in a positive slope for a span and drops in a negative slope for a span. Due to the output voltage Vout equaling the feedback voltage $V_{FB}$, the feedback voltage $V_{FB}$ could be represented as the product of the inductor current $I_L$ and the equivalent series resistance ESR. Assume that the constant-time trigger 16 is an on time trigger for controlling turning on the first switch SW1 for a fixed time $T_{ON}$. The comparator 15 is used for comparing the feedback voltage $V_{FB}$ and the reference voltage Vref. When the feedback voltage $V_{FB}$ is lower than the reference voltage Vref, the comparator 15 triggers a high level signal to the constant-time trigger 16. The constant-time trigger 16 controls the first switch SW1 to turn on for the fixed time $T_{ON}$ and to turn off the first switch SW1. The constant-time trigger 16 turns on the second switch SW2 to form a loop.

Please refer to FIG. 3 that is a diagram illustrating signal waveforms in FIG. 1. The difference between FIG. 2 and FIG. 3 is that there are errors existing between the root mean square value (RMS) of the feedback voltage $V_{FB}$ and the reference voltage Vref. Due to the output voltage Vout equaling the feedback voltage $V_{FB}$, the feedback voltage $V_{FB}$ could be represented as the product of the inductor current $I_L$ and the equivalent series resistance ESR. The root mean square value (RMS) of the feedback voltage $V_{FB}$ could be affected by changing the inductor current $I_L$ or the equivalent series resistance ESR. At this time, the errors existing between the root mean square value (RMS) of the feedback voltage $V_{FB}$ and the reference voltage Vref will be adjusted.

Output voltage compensation of a switching regulator application is already disclosed in U.S. Pat. No. 6,813,173 "DC-To-DC Converter with Improved Transient Response". In U.S. Pat. No. 6,813,173, the method of work is utilizing the difference between the reference voltage Vref and the feedback voltage $V_{FB}$ to adjust the output voltage of system. The adjusted signal after comparison is added to the feedback voltage $V_{FB}$.

Due to the root mean square value (RMS) of the feedback voltage $V_{FB}$ of the switching regulator 10 being affected by the inductor current $I_L$ and the equivalent series resistance ESR, there are errors generated between the feedback voltage $V_{FB}$ and the reference voltage Vref. The output voltage Vout generated by the switching regulator is not precise which cause more inaccuracy in a circuit requiring voltage accuracy.

SUMMARY OF THE INVENTION

The claimed invention provides a switching regulator capable of compensating output errors. The switching regulator includes a power stage, an output capacitor, a first reference voltage generator, a comparator, a constant-time trigger, an error amplifier, and an operator. The power stage includes a first switch, a second switch, and an output inductor. The second switch is coupled to the first switch, and the output inductor is coupled to the first switch and the second switch. The output capacitor is coupled to the output inductor with an output voltage across the capacitor. The first reference voltage generator is used for generating a first reference voltage. The comparator includes a first input end coupled to the output inductor and to the output capacitor and a second input end. The comparator is used for comparing signals received at the first and second input ends of the comparator. The constant-time trigger is coupled between an output end of the comparator and a control end of the power stage. The error amplifier includes a first input end coupled to the output inductor and to the output capacitor for receiving the output voltage and a second input end coupled to the reference voltage generator for receiving the reference voltage. The operator includes a first input end coupled to the reference voltage generator for receiving the reference voltage, a second input end coupled to an output end of the error amplifier for receiving the compensation signal, and an output end coupled to the second input end of the comparator.

The claimed invention further provides a switching regulator capable of compensating output errors. The switching regulator includes a plurality power stages, an output capacitor, a first reference voltage generator, a comparator, a constant-time trigger, an error amplifier, and an operator. Each power stage includes a first switch, a second switch, and an output inductor. The second switch is coupled to the first switch, and the output inductor is coupled to the first switch and to the second switch. The output capacitor is coupled to the output inductors with an output voltage across the capacitor. The first reference voltage generator is used for generating a first reference voltage. The comparator includes a first input end coupled to the output inductors and to the output capacitor and a second input end. The comparator is used for comparing signals received at the first and second input ends of the comparator. The constant-time trigger is coupled between an output end of the comparator and a control end of each power stage. The error amplifier includes a first input end coupled to the output inductors and to the output capacitor for receiving the output voltage and a second input end coupled to the reference voltage generator for receiving the reference voltage. The operator includes a first input end coupled to the reference voltage generator for receiving the reference voltage, a second input end coupled to an output end of the error amplifier for receiving the compensation signal, and an output end coupled to the second input end of the comparator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
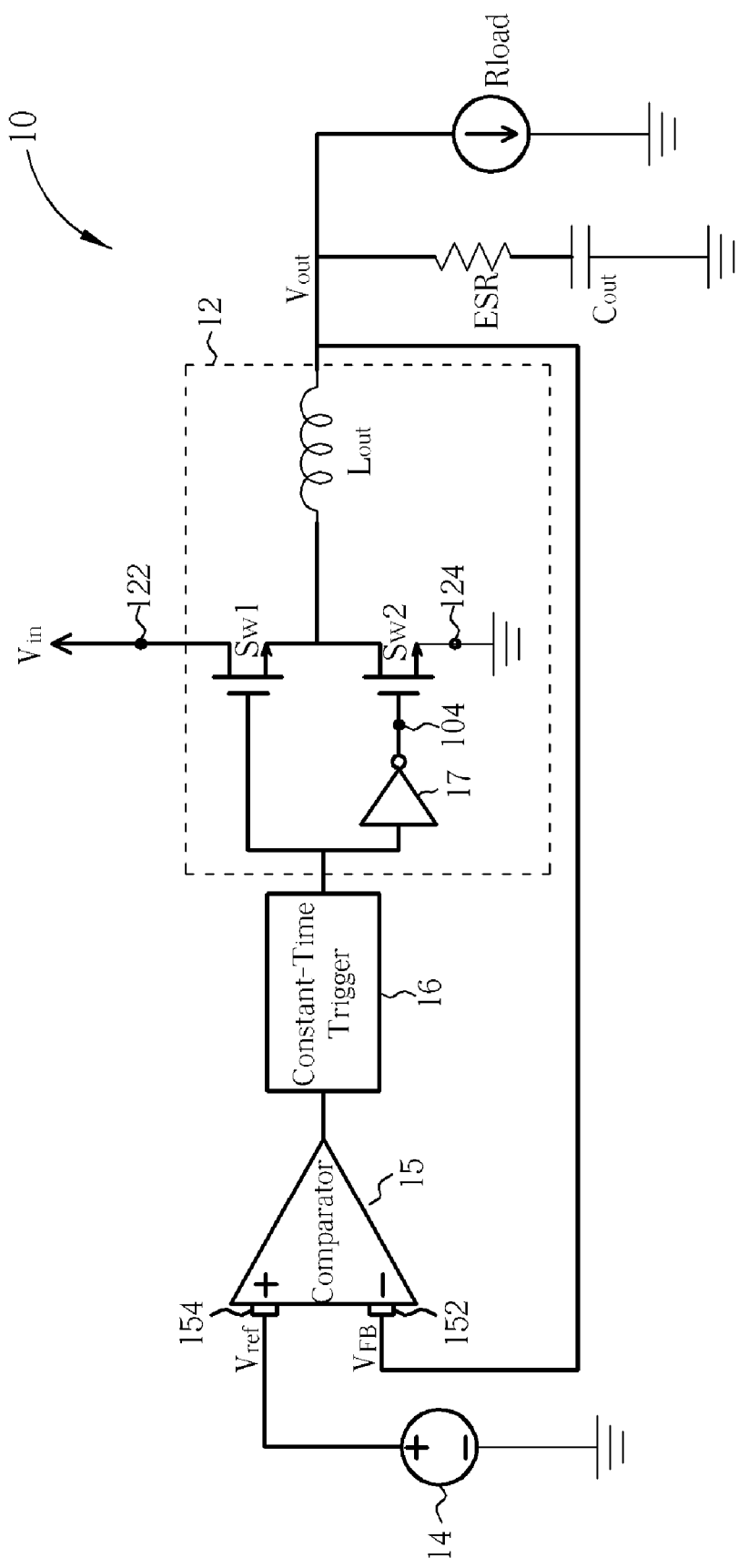
FIG. 1 is a diagram of a switching regulator according to the prior art.
Figure 2:
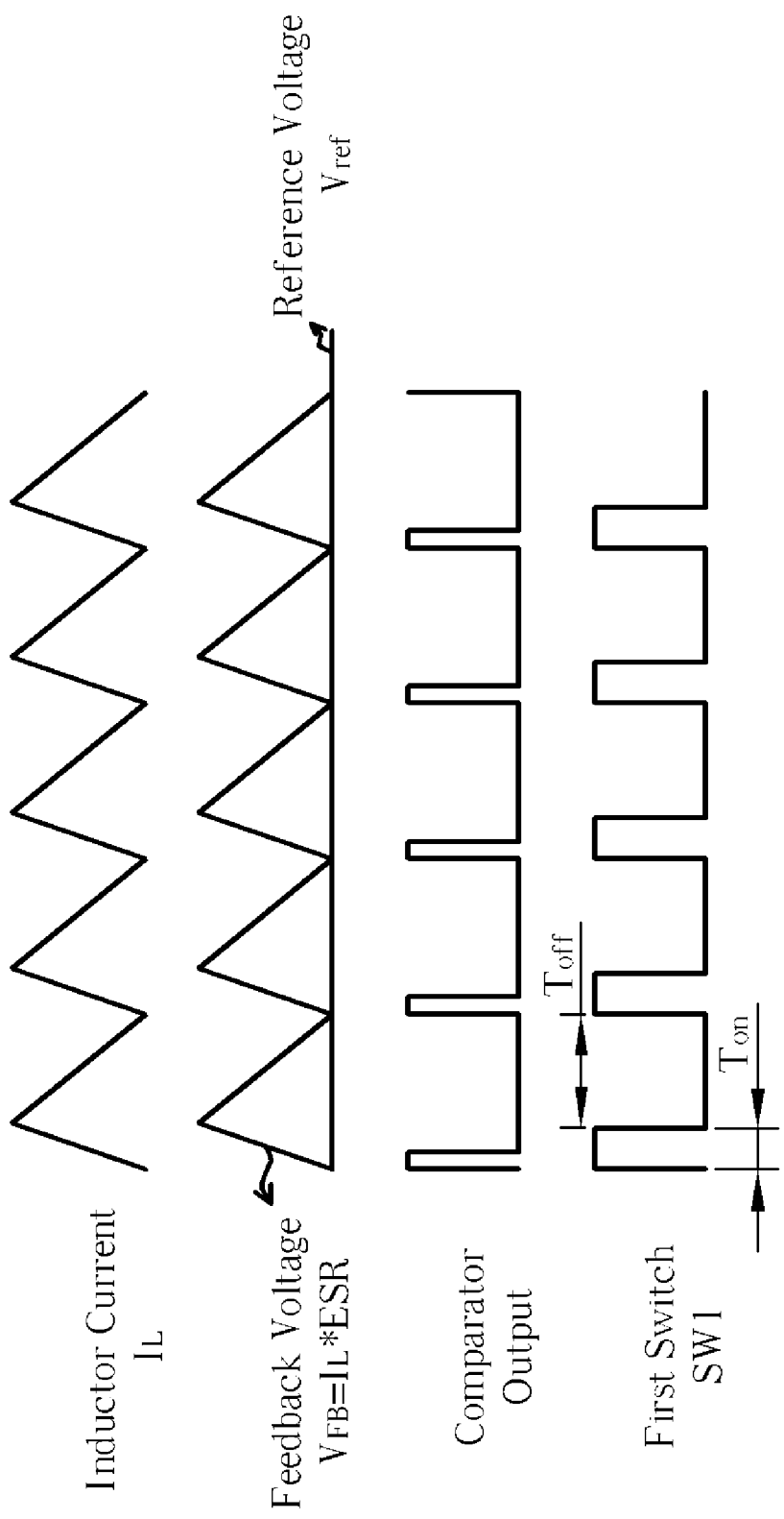
FIG. 2 is a diagram illustrating signal waveforms in FIG. 1.
Figure 3:
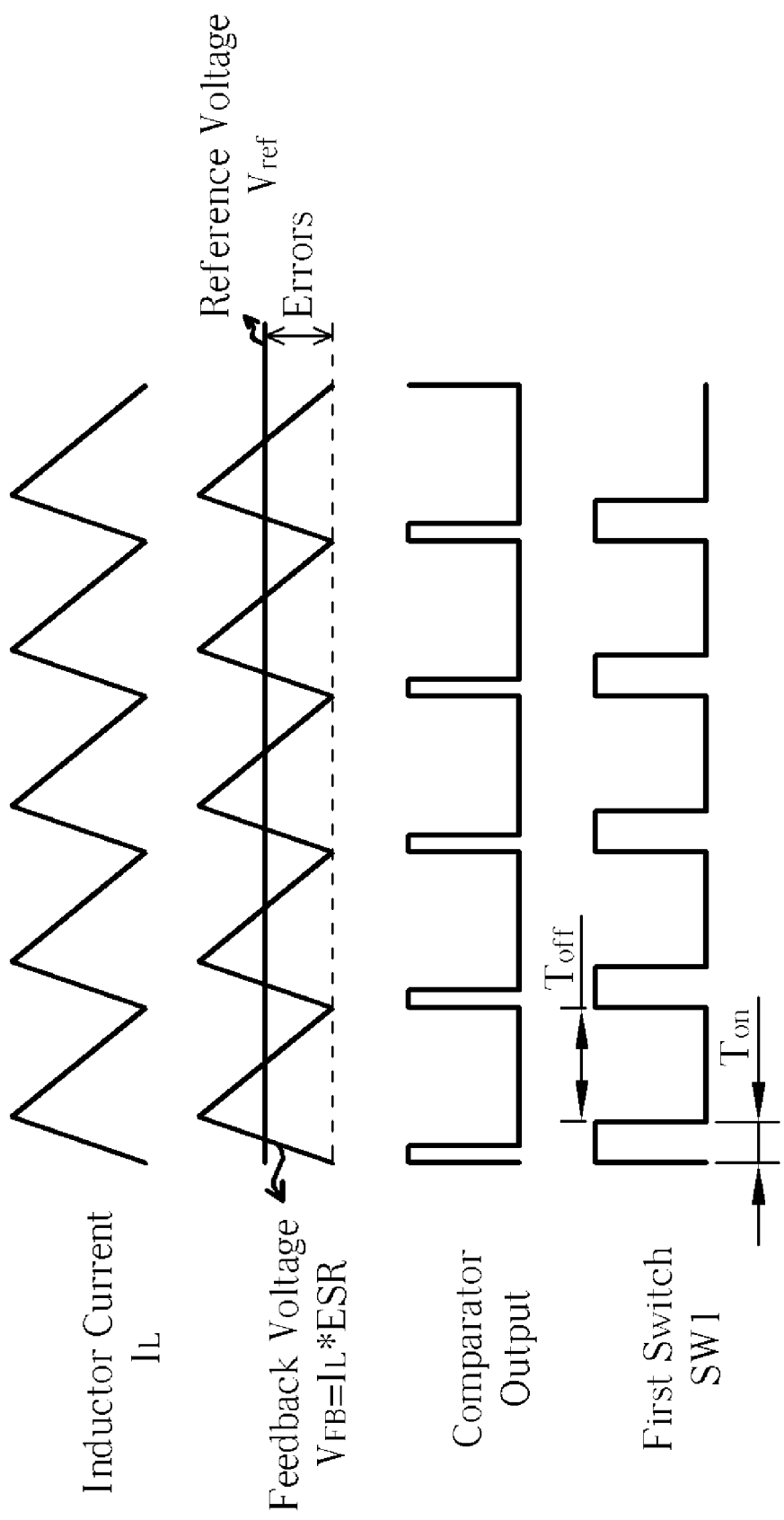
FIG. 3 is a diagram illustrating signal waveforms in FIG. 1.
Figure 4:
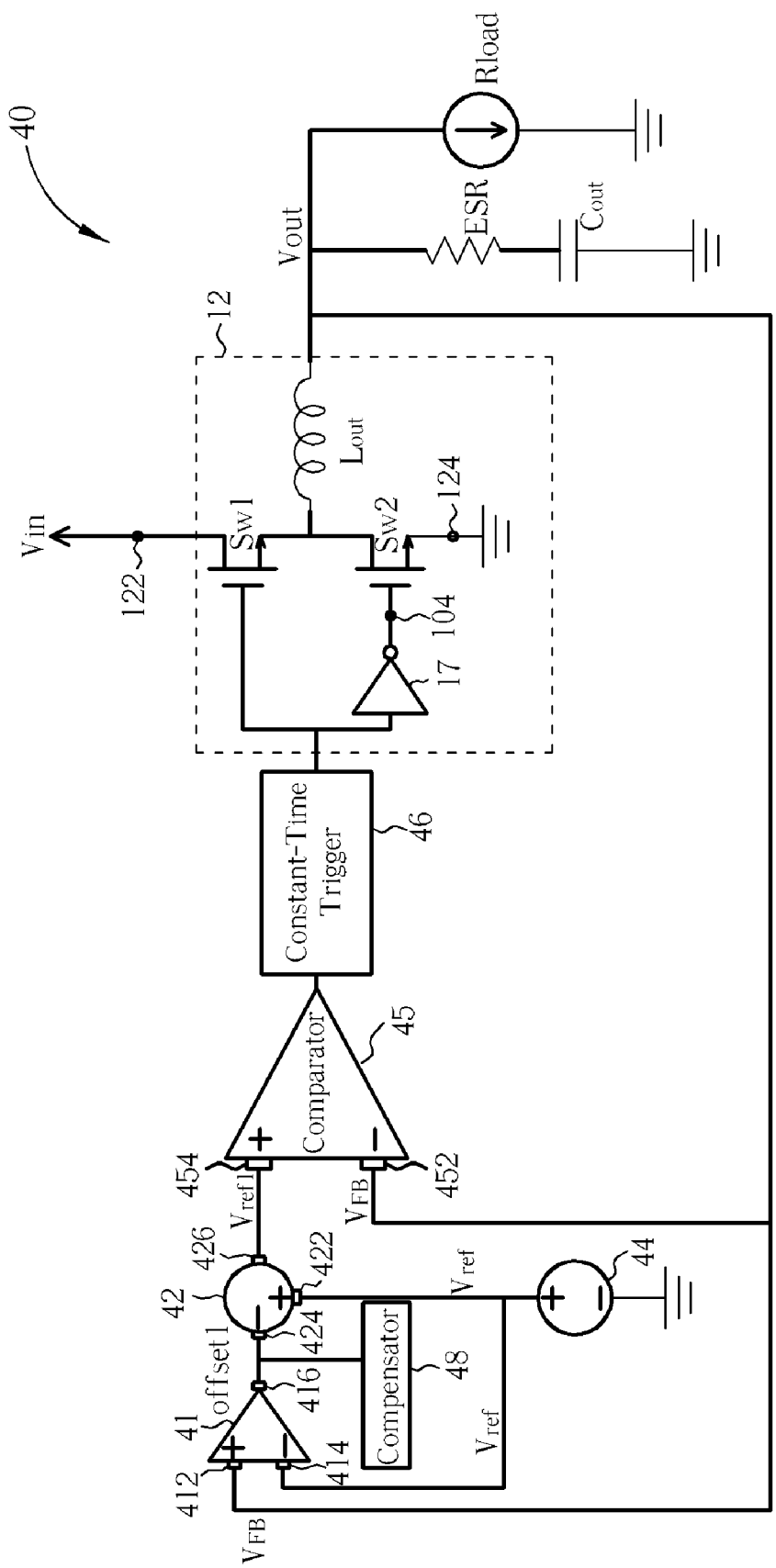
FIG. 4 is a diagram of a switching regulator according to the present invention.

Please refer to FIG. 4 that is a diagram of a switching regulator 40 according to the present invention. The switching regulator 40 includes a power stage 12, an output capacitor Cout, a loading Rload, a reference voltage generator 44, a comparator 45, a constant-time trigger 46, an error amplifier 41, and an operator 42. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 46 and a control end 104 of the second switch SW2 for processing an inverse operation on a signal outputted from the constant-time trigger 46. The output capacitor Cout is coupled to the output inductor Lout with an output voltage Vout across the capacitor. The output capacitor Cout further includes an equivalent series resistance ESR. The loading Rload is coupled to the output capacitor Cout and the output inductor Lout. The reference voltage generator 44 is used for generating a reference voltage Vref. The comparator 45 includes a first input end 452 coupled to the output inductor Lout and the output capacitor Cout for receiving a feedback voltage $V_{FB}$ (equals the output voltage Vout). The comparator 45 includes a second input end 454 coupled to an output end 426 of the operator 42. The constant-time trigger 46 is coupled to the comparator 45 and the power stage 12. The constant-time trigger 46 is used for controlling turning on and off the first switch SW1 and the second switch SW2 of the power stage 12 according to a result of the comparator 45. The error amplifier 41 includes a first input end 412 coupled to the output inductor Lout and the output capacitor Cout for receiving the output voltage Vout and a second input end 414 coupled to the reference voltage generator 44 for receiving the reference voltage Vref. The error amplifier 41 is used for generating a compensation signal Offset1 according to signals received at the first input end 412 and the second input end 414 (the reference voltage Vref and the feedback voltage $V_{FB}$). The operator 42 includes a first input end 422 coupled to the reference voltage generator 44 for receiving the reference voltage Vref, a second input end 424 is coupled to an output end 416 of the error amplifier 41 for receiving the compensation signal Offset1, and an output end 426 coupled to the second input end 454 of the comparator 45. The operator 42 is used for generating a compensation reference voltage Vref1 according to the reference voltage Vref and the compensation signal Offest1. The operator 42 is a subtractor used for subtracting the compensation signal Offest1 from the reference voltage Vref to generate the compensation reference voltage Vref1. Therefore, the compensation reference voltage Vref1 can be represented as:

Vref1=Vref−Offset1×Gain1, where Gain1 is the gain of the error amplifier 41.

Please continue to refer to FIG. 4. The switching regulator 40 further includes a compensator 48 coupled to an output end 416 of the error amplifier 41 and the second input end 424 of the operator 42. The compensator 48 is used for compensating stability of the error amplifier 41. An input end 122 of the first switch SW1 is coupled to an input voltage Vin, and an input end 124 of the second switch SW2 is coupled to ground. The comparator 45 is an error comparator. The first switch SW1 and the second switch SW2 are metal-oxide semiconductor transistors (MOS). When the constant-time trigger 46 is an on-time trigger, constant-time trigger 46 is used for controlling on time of the first switch SW1 and the second switch SW2. When the constant-time trigger 46 is an off-time trigger, constant-time trigger 46 is used for controlling off time of the first switch SW1 and the second switch SW2.

Please continue to refer to FIG. 4. When the root mean square value (RMS) of the feedback voltage $V_{FB}$ is greater than the reference voltage Vref, the voltage level of the compensation signal Offset1 outputted from the output end 416 of the error amplifier 41 rises. This causes the compensation reference voltage Vref1 drop off until the root mean square value (RMS) of the feedback voltage $V_{FB}$ is equal to the reference voltage Vref. On the contrary, when the root mean square value (RMS) of the feedback voltage $V_{FB}$ is lower than the reference voltage Vref, the voltage level of the compensation signal Offset1 outputted from the output end 416 of the error amplifier 41 drops off. This causes the compensation reference voltage Vref1 to increase until the root mean square value (RMS) of the feedback voltage $V_{FB}$ is equal to the reference voltage Vref.

Figure 5:
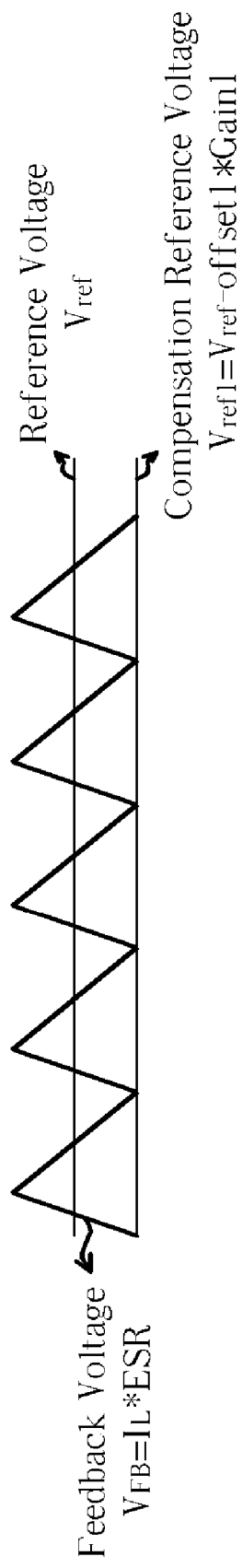
FIG. 5 is a diagram illustrating the compensation reference voltage and the feedback voltage in FIG. 4.

Please refer to FIG. 5 and FIG. 4. FIG. 5 is a diagram illustrating the compensation reference voltage and the feedback voltage in FIG. 4. At first, the reference voltage Vref is not equal to the root mean square value (RMS) of the feedback voltage $V_{FB}$. The compensation signal Offset1 is generated after the error amplifier 41 compares the reference voltage Vref with the root mean square value (RMS) of the feedback voltage $V_{FB}$. Then the operator 42 is used for subtracting the compensation signal Offset1 that is gained by the error amplifier 41 from the reference voltage Vref to generate the compensation reference voltage Vref1. Then the compensation reference voltage Vref1 and the feedback voltage $V_{FB}$ are transmitted to the comparator 45 for comparison. The compensation reference voltage Vref1 after compensation is more accurate than the original reference voltage Vref. Therefore, the desired output voltage Vout is obtained.

The above-mentioned embodiments illustrate but do not limit the present invention. The constant-time trigger 46 could be an on-time trigger or an off-time trigger for controlling turning on or turning off the first switch SW1 and the second switch SW2. The inverter 17 can be coupled between the constant-time trigger 46 and a control end of the first switch SW1. The switching regulator 40 includes one power stage 12 but can be expanded to two or a plurality of power stages 12. Furthermore, the operator 42 is not restricted to a subtractor, it could be an operator of another type.

In conclusion, the present invention provides a switching regulator capable of compensating output errors. Due to the errors between the root mean square value (RMS) of the feedback voltage $V_{FB}$ and the reference voltage Vref being able to be adjusted by the error amplifier 41 and the operator 42, the errors between the output voltage Vout and the reference voltage Vref can be avoided. Therefore, a more accurate output voltage Vout is obtained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulator capable of compensating output errors comprising:
    a power stage, the power stage comprising:
        a first switch;
        a second switch coupled to the first switch; and
        an output inductor coupled to the first switch and the second switch;
    an output capacitor coupled to the output inductor with an output voltage across the capacitor;
    a reference voltage generator used for generating a reference voltage;
    a comparator having a first input end coupled to the output inductor and the output capacitor and a second input end, the comparator used for comparing signals received by these two input ends;
    a constant-time trigger coupled between an output end of the comparator and a control end of the power stage, the constant-time trigger used for controlling turning on and off the first switch and the second switch of the power stage according to a result of the comparator;
    an error amplifier having a first input end coupled to the output inductor and the output capacitor for receiving the output voltage, and a second input end coupled to the reference voltage generator for receiving the reference voltage, the error amplifier used for generating a compensation signal according to signals received by these two input ends; and
    an operator having a first input end coupled to the reference voltage generator for receiving the reference voltage, a second input end coupled to an output end of the error amplifier for receiving the compensation signal, and an output end coupled to the second input end of the comparator, the operator used for generating a compensation reference voltage according to the reference voltage and the compensation signal.

2. The switching regulator of claim 1 further comprising a compensator coupled to an output end of the error amplifier, the compensator used for compensating stability of the error amplifier.

3. The switching regulator of claim 1 wherein the operator is a subtractor used for subtracting the reference voltage from the compensation signal.

4. The switching regulator of claim 1 further comprising a loading coupled to the output capacitor and the output inductor.

5. The switching regulator of claim 1 wherein the output capacitor comprises an equivalent series resistance (ESR).

6. The switching regulator of claim 1 wherein the first switch and the second switch are metal-oxide semiconductor transistors (MOS).

7. The switching regulator of claim 1 further comprising an inverter coupled to the constant-time trigger and a control end of the second switch for processing an inverse operation on a signal outputted from the constant-time trigger.

8. The switching regulator of claim 1 wherein the constant-time trigger is an on-time trigger.

9. The switching regulator of claim 1 wherein the constant-time trigger is an off-time trigger.

10. A switching regulator capable of compensating output errors comprising:
    a plurality of power stages, wherein each power stage comprises:
        a first switch;
        a second switch coupled to the first switch; and
        an output inductor coupled to the first switch and the second switch;
    an output capacitor coupled to the output inductors with an output voltage across the capacitor;
    a reference voltage generator used for generating a reference voltage;
    a comparator having a first input end coupled to the output inductors and the output capacitor and a second input end, the comparator used for comparing signals received by these two input ends;
    a constant-time trigger coupled between an output end of the comparator and a control end of the plurality of power stages, the constant-time trigger used for controlling turning on and off the first switch and the second switch of the plurality of power stages according to a result of the comparator;
    an error amplifier having a first input end coupled to the output inductors and the output capacitor for receiving the output voltage, and a second input end coupled to the reference voltage generator for receiving the reference voltage, the error amplifier used for generating a compensation signal according to signals received by these two input ends; and
    an operator having a first input end coupled to the reference voltage generator for receiving the reference voltage, a second input end coupled to an output end of the error amplifier for receiving the compensation signal, and an output end coupled to the second input end of the comparator, the operator used for generating a compensation reference voltage according to the reference voltage and the compensation signal.

11. The switching regulator of claim 10 further comprising a compensator coupled to an output end of the error amplifier, the compensator used for compensating stability of the error amplifier.

12. The switching regulator of claim 10 wherein the operator is a subtractor used for subtracting the reference voltage from the compensation signal.

13. The switching regulator of claim 10 further comprising a loading coupled to the output capacitor and the output inductors.

14. The switching regulator of claim 10 wherein the output capacitor comprises an equivalent series resistance (ESR).

15. The switching regulator of claim 10 wherein the first switch and the second switch are metal-oxide semiconductor transistors (MOS).

16. The switching regulator of claim 10 further comprising an inverter coupled to the constant-time trigger and a control end of the second switch for processing an inverse operation on a signal outputted from the constant-time trigger.

17. The switching regulator of claim 10 wherein the constant-time trigger is an on-time trigger.

18. The switching regulator of claim 10 wherein the constant-time trigger is an off-time trigger.

* * * * *